Oct. 16, 1923.
F. F. LUCAS
1,470,990
PROCESS OF MANUFACTURING INSULATING MATERIAL
Filed Oct. 3, 1921
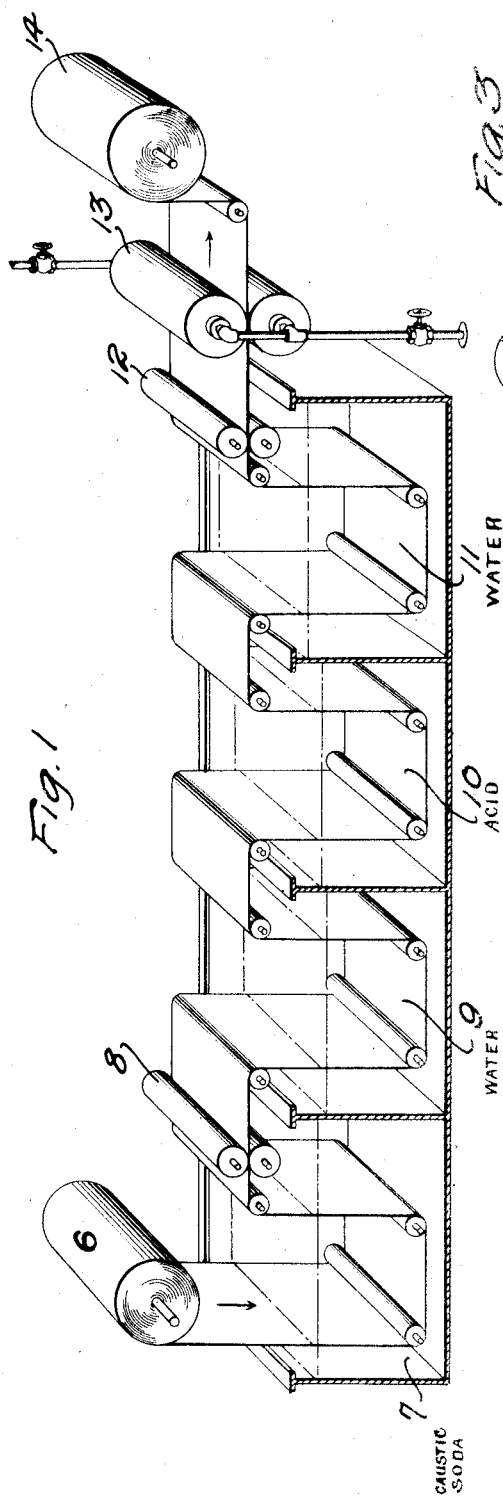
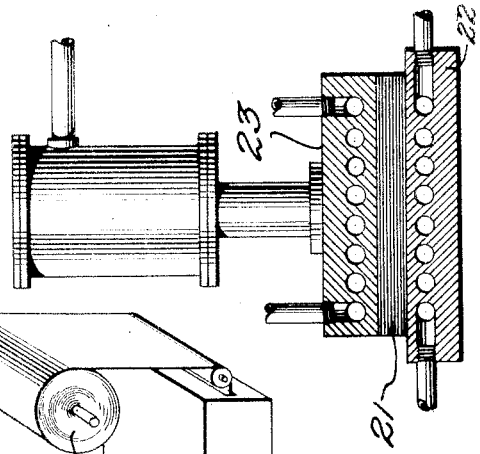
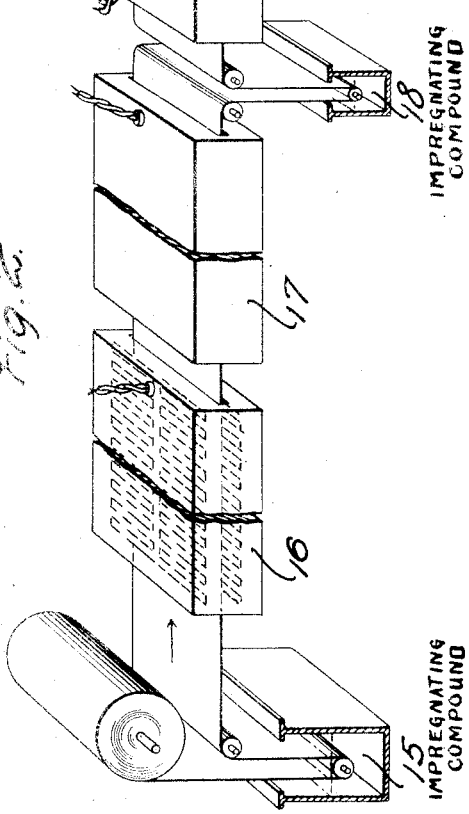
Inventor:
Francis F. Lucas,
by Joel CR. Loumes
Atty.

Patented Oct. 16, 1923.

1,470,990

UNITED STATES PATENT OFFICE.

FRANCIS F. LUCAS, OF EAST ORANGE, NEW JERSEY, ASSIGNOR TO WESTERN ELECTRIC COMPANY, INCORPORATED, OF NEW YORK, N. Y., A CORPORATION OF NEW YORK.

PROCESS OF MANUFACTURING INSULATING MATERIAL.

Application filed October 3, 1921. Serial No. 504,833.

*To all whom it may concern:*

Be it known that I, FRANCIS F. LUCAS, a citizen of the United States, residing at East Orange, in the county of Essex, State of New Jersey, have invented certain new and useful Improvements in Processes of Manufacturing Insulating Material, of which the following is a full, clear, concise, and exact description.

This invention relates to insulating materials and the like, and particularly to an improved process for manufacturing such materials from impregnated fibre, its object being a product having high electrical resistance and mechanical strength.

Heretofore materials of this sort have been made by superposing sheets of paper or similar fibrous material which previously have been soaked in or impregnated with phenolic resin, and compacting them into a solid mass by heat and pressure.

This invention provides an additional step to the processes previously used, whereby the electrical resistance of the finished product, particularly under severe humidity conditions, is greatly increased. This additional step consists in subjecting the impregnated fibrous base to a preliminary curing treatment whereby the phenolic resin with which the fibers are surrounded, is given a consistency and viscosity approximately that of the fibres themselves.

The theory on which this improved process is based is that where the impregnating medium is in too fluid a state at the time pressure is applied to the mass, this medium will be forced out of the interstices between the fibres by the pressure applied in the final curing treatment so that contacting fibres in the mass will be forced together without the necessary intervening layer of insulation, thus providing conducting paths from one fibre to another through the mass which, when humidity is present, may permit excessive electrical leakage. If, therefore, the impregnated fibrous base be given a preliminary curing process sufficient partially to solidify the resin and give it a consistency, i. e., a resistance to mechanical stresses, which, during the final curing process, will be equal approximately to that of the fibres, the subsequent application of pressure to the mass will not cause an extrusion of the resin but will result in a compact mass in which the individual fibres are each surrounded with an insulating layer of resin.

Microscopic examination of, and electrical tests made upon the finished product of this invention in comparison with the product of other processes, indicate that this theory is sound and that it accounts for the superior product of this invention.

The process will be better understood from the following detailed description and by reference to the accompanying drawings in which—

Fig. 1 shows schematically an arrangement for the preliminary treating of paper to increase its absorption properties.

Fig. 2 is a schematic view showing the manner in which the paper is impregnated with the resin.

Fig. 3 is a view showing the manner in which a plurality of sheets of impregnated paper are subjected to pressure and heat to provide an insulating sheet of the desired thickness.

In Fig. 1 the untreated paper first passes from reel 6 through a tank 7 containing a caustic soda solution and then passes between a pair of rubber rolls 8 which remove the excess solution. The paper then passes into a tank 9 containing circulating water to wash off the soda solution from the surface and then passes into tank 10 which contains an acid solution adapted to neutralize any alkali remaining in the paper. From the acid solution the paper passes into tank 11 which contains circulating water and is adapted to remove all acid trace from the paper. The paper next passes between rubber rolls 12 to remove excess water and then between the steam rolls 13 to dry the paper before it passes upon the reel 14.

By means of such a mercerizing treatment the physical characteristics of the paper are completely changed so that the treated paper becomes saturated almost instantly when later placed in a bath of impregnating material whereas untreated paper absorbs the impregnating material much more slowly and less completely. The individual fibres of the paper, as may be seen by microscopical examination, are changed in shape and dimension by this treatment. The spirally twisted, ribbon-like fibres of the paper become unwound and then swelled, the lumen which normally is broad and flat contracts to a small cylindrical opening and the fibres finally become kinked and twisted and very wiry. Moreover, the arrangement of individual fibres is such that the interstices of the paper become smaller, thus increasing the capillary action and insuring more complete impregnation. The strength of the paper is also increased very appreciably by this treatment, thus facilitating handling during impregnation.

The impregnation of the paper, as shown schematically in Fig. 2, consists in first passing the paper through an impregnating tank 15, containing the impregnating liquid. When employing for this purpose a phenol resin, having a specific gravity of about .970, the time in the tank is approximately two minutes for an untreated paper and one minute or less for paper treated as described above. From the impregnating bath the paper passes into a drying oven 16, which, as shown, may be electrically heated. The temperature of this oven should be approximately 90° C. and the time sufficient to dry the paper. The dry paper next passes through a curing oven 17 which is of the same type as the drying oven 16 but which is maintained at a temperature of from 120° to 130° C. In order to cure the paper to the desired degree the time of exposure should be approximately ten minutes. After passing through this oven the individual fibres of the paper are thoroughly coated with impregnating material and this material is cured to such a degree that when the material is later subjected to pressure and heat, the impregnating material will not be forced from the individual fibres. The partially cured paper next passes through an impregnating bath 18 of phenolic resin in which the paper is immersed for a period of ten to fifteen seconds. It then passes through a drying oven 19 maintained at a temperature of approximately 90° C., the time of passing being sufficient to cause the paper to become dry enough to permit it being wound upon the reel 20.

It will be understood that if other impregnating mediums are to be used, the duration of treatment and the temperatures above given by way of example would need to be varied to suit the physical and chemical characteristics of the particular impregnating medium employed.

To complete the curing of the resin and provide a solid mass, sheets 21 of the impregnated paper having the desired dimensions, are placed one on another between the steam-heated platens 22 and 23 and subjected to pressure. It is obvious that the paper after passing through the mercerizing process instead of being wound on the reel 14, may continue without interruption through the various steps illustrated in Fig. 2. In this case some modification may be necessary in the dimensions of the ovens and the impregnating tanks.

What is claimed is:

1. The method of treating fibrous or cellular material which consists in impregnating the material with a resin which may be solidified upon the application of pressure, partially curing the resin so that its consistency when later subjected to heat and pressure in the final curing will be approximately that of the material, and finally curing the resin by the application of heat and pressure.

2. The method of treating fibrous or cellular material which consists in treating the material to increase its absorptive properties, impregnating the material with a phenolic resin so that all individual fibres or cells are thoroughly coated and rich in resin content, partially curing the resin so that its consistency when later subjected to heat and pressure during the final curing will be approximately equal to that of the material, and finally curing by the application of heat and pressure.

3. The method of treating fibrous or cellular material which consists in mercerizing the material to increase its absorptive properties, impregnating the material with phenolic resin so that the individual fibres are thoroughly coated and are rich in resin content, partially curing of the resin, covering the partially cured material with a coating of phenolic resin, and finally curing by the application of heat and pressure.

4. The method of treating fibrous or cellular material which consists in mercerizing the material to increase its absorptive qualities, immersing for approximately one minute in a bath of phenolic resin having a specific gravity of approximately .970, drying at a temperature of approximately 90° C., partially curing by placing in an oven maintained at a temperature of approximately 125° C., for a period of approximately ten seconds, immersing in a bath of phenolic resin for ten to fifteen seconds, drying at a temperature of approximately 90° C., and finally curing by the application of heat and pressure.

5. The method of forming a fibrous insulating material which comprises impregnating a fibrous material with a phenolic condensation product, curing the condensation product to such a consistency that upon the subsequent application of pressure to the mass the condensation product will not be extruded, and finally curing the condensation product by the application of heat and pressure.

In witness whereof I hereunto subscribe my name this 29th day of September, A. D. 1921.

FRANCIS F. LUCAS.